US009018783B2

(12) United States Patent
Cooper

(10) Patent No.: US 9,018,783 B2
(45) Date of Patent: Apr. 28, 2015

(54) DOUBLY-FED INDUCTION GENERATOR WIND TURBINE SYSTEM HAVING SOLID-STATE STATOR SWITCH

(71) Applicant: General Electric Company, Schenectady, NY (US)

(72) Inventor: Ronald C. Cooper, Gastonia, NC (US)

(73) Assignee: General Electric Company, Schenectady, NY (US)

( * ) Notice: Subject to any disclaimer, the term of this patent is extended or adjusted under 35 U.S.C. 154(b) by 4 days.

(21) Appl. No.: 13/898,605

(22) Filed: May 21, 2013

(65) Prior Publication Data
US 2014/0346774 A1 Nov. 27, 2014

(51) Int. Cl.
| F03D 9/00 | (2006.01) |
| H02P 9/04 | (2006.01) |
| H02P 9/00 | (2006.01) |
| F03D 7/02 | (2006.01) |

(52) U.S. Cl.
CPC ........................................ *F03D 7/02* (2013.01)

(58) Field of Classification Search
CPC .... H02J 1/102; H02J 3/386; H03K 17/08144; H03K 17/0824; H03K 17/105; H03K 17/723; Y10S 388/903; Y02E 10/70; F05B 2240/21; F05B 2240/24; F05B 2240/10; F05B 2240/20; F03D 7/00; B60K 16/00; B60L 8/006
USPC .......................................... 290/43, 44, 54, 55
See application file for complete search history.

(56) References Cited

U.S. PATENT DOCUMENTS

| 3,723,815 | A | | 3/1973 | Ambler et al. | |
| 3,919,620 | A | * | 11/1975 | McMurray et al. | 363/135 |
| 4,087,701 | A | * | 5/1978 | Anderson | 307/149 |
| 4,654,770 | A | * | 3/1987 | Santurtun et al. | 363/17 |
| 4,684,867 | A | * | 8/1987 | Miller et al. | 318/701 |
| 4,896,089 | A | * | 1/1990 | Kliman et al. | 318/701 |
| 4,955,069 | A | | 9/1990 | Ionescu | |
| 5,331,234 | A | | 7/1994 | Merritt et al. | |
| 5,451,865 | A | * | 9/1995 | Coburn | 324/127 |
| 5,479,102 | A | * | 12/1995 | El-Hamamsy et al. | 324/414 |
| 6,462,605 | B1 | * | 10/2002 | Hanks | 327/438 |
| 6,856,038 | B2 | * | 2/2005 | Rebsdorf et al. | 290/44 |
| 7,471,011 | B2 | * | 12/2008 | Janssen | 290/55 |
| 2002/0140377 | A1 | * | 10/2002 | Backs et al. | 315/290 |
| 2002/0149414 | A1 | * | 10/2002 | Glidden | 327/438 |
| 2005/0187738 | A1 | | 8/2005 | Zuzuly et al. | |
| 2007/0024059 | A1 | * | 2/2007 | D'Atre et al. | 290/44 |
| 2009/0001940 | A1 | * | 1/2009 | Sihler et al. | 322/58 |

(Continued)

OTHER PUBLICATIONS

Powerex POW-R-Blok Module Application Information product brochure.
High Power Engineering NAVY Transition Assistance Program brochure.

(Continued)

*Primary Examiner* — Tulsidas C Patel
*Assistant Examiner* — Charles Reid, Jr.
(74) *Attorney, Agent, or Firm* — Dority & Manning, P.A.

(57) ABSTRACT

Wind turbine systems and methods are provided. An exemplary system includes a wind driven doubly fed induction generator having a rotor and a stator, the stator providing AC power to a stator bus. The system further includes a power converter coupled to the rotor of the doubly fed induction generator, the power converter providing an output to a line bus, and a transformer coupled to the stator bus. The system further includes a solid-state switch coupled between the stator bus and the transformer.

17 Claims, 5 Drawing Sheets

(56) References Cited

U.S. PATENT DOCUMENTS

| | | |
|---|---|---|
| 2010/0060000 A1* | 3/2010 | Scholte-Wassink ............ 290/44 |
| 2011/0140430 A1* | 6/2011 | Ritter et al. ..................... 290/44 |
| 2011/0273844 A1 | 11/2011 | Rivera Hernandez et al. |
| 2012/0007425 A1 | 1/2012 | Rozman et al. |

OTHER PUBLICATIONS

Powerex Series Connection Matching presentation slides.

Sherbondy, G.M., "Series Connected Semiconductors", Powerex Technical Update, No. 95-1.

Powerex T9KC_0603 Phase Control Thyristor product brochure.

\* cited by examiner

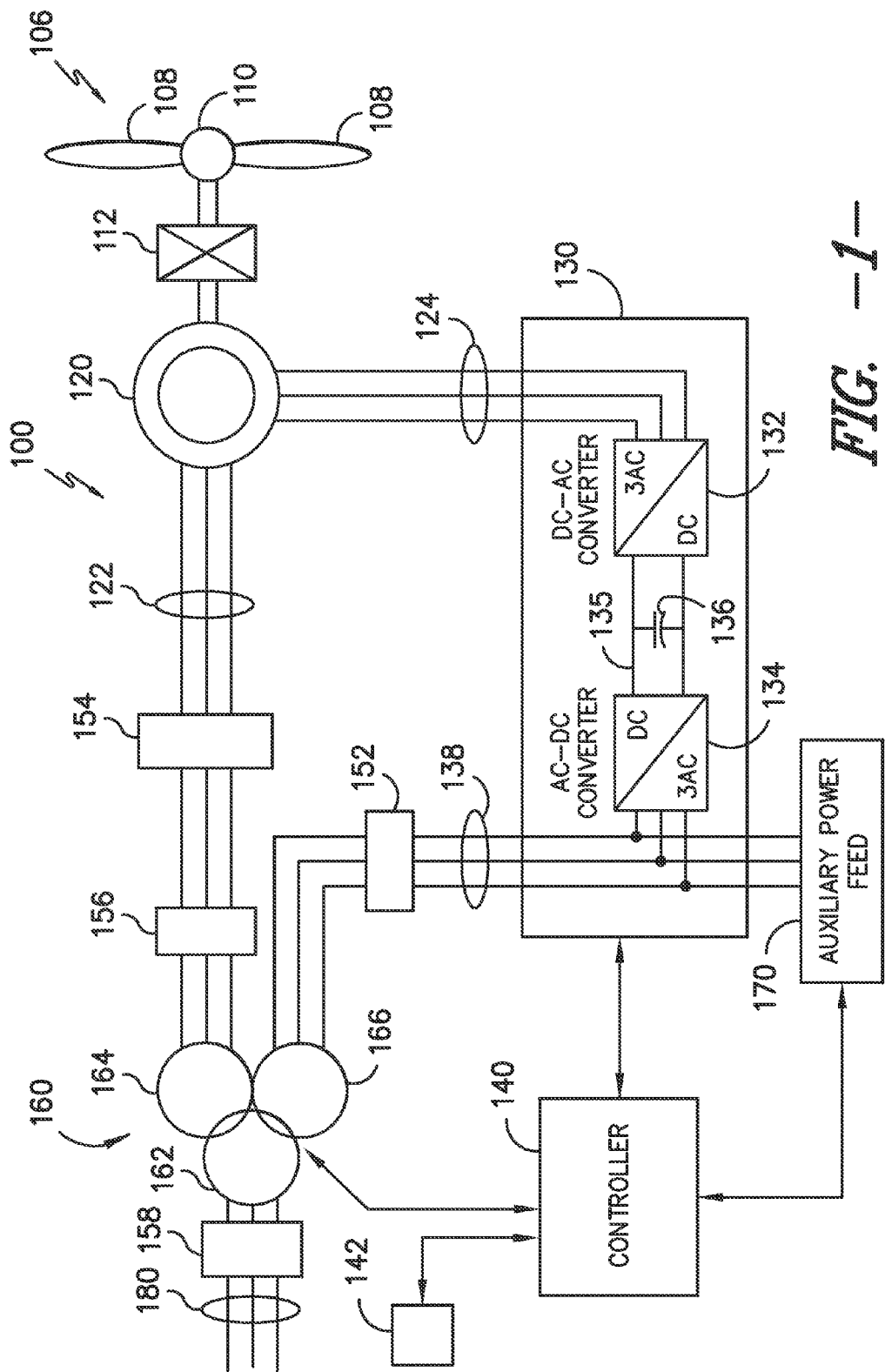
FIG. -1-

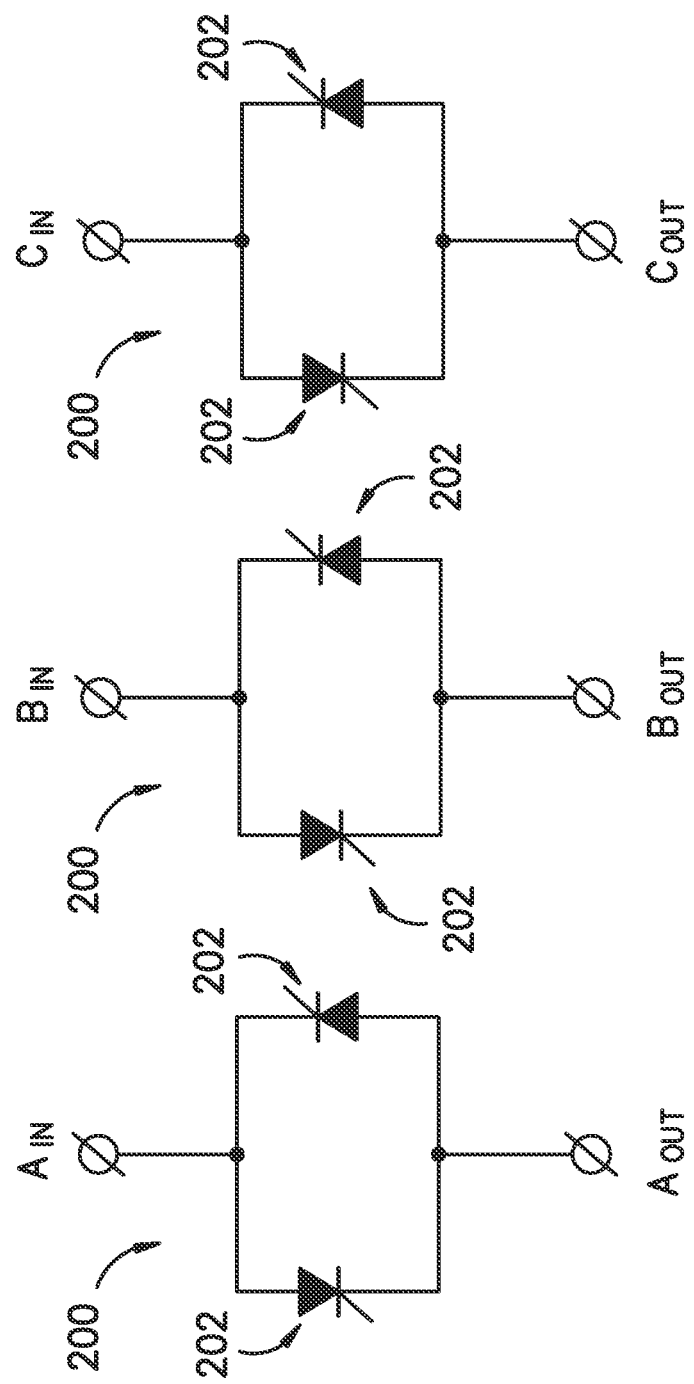
FIG. -2-

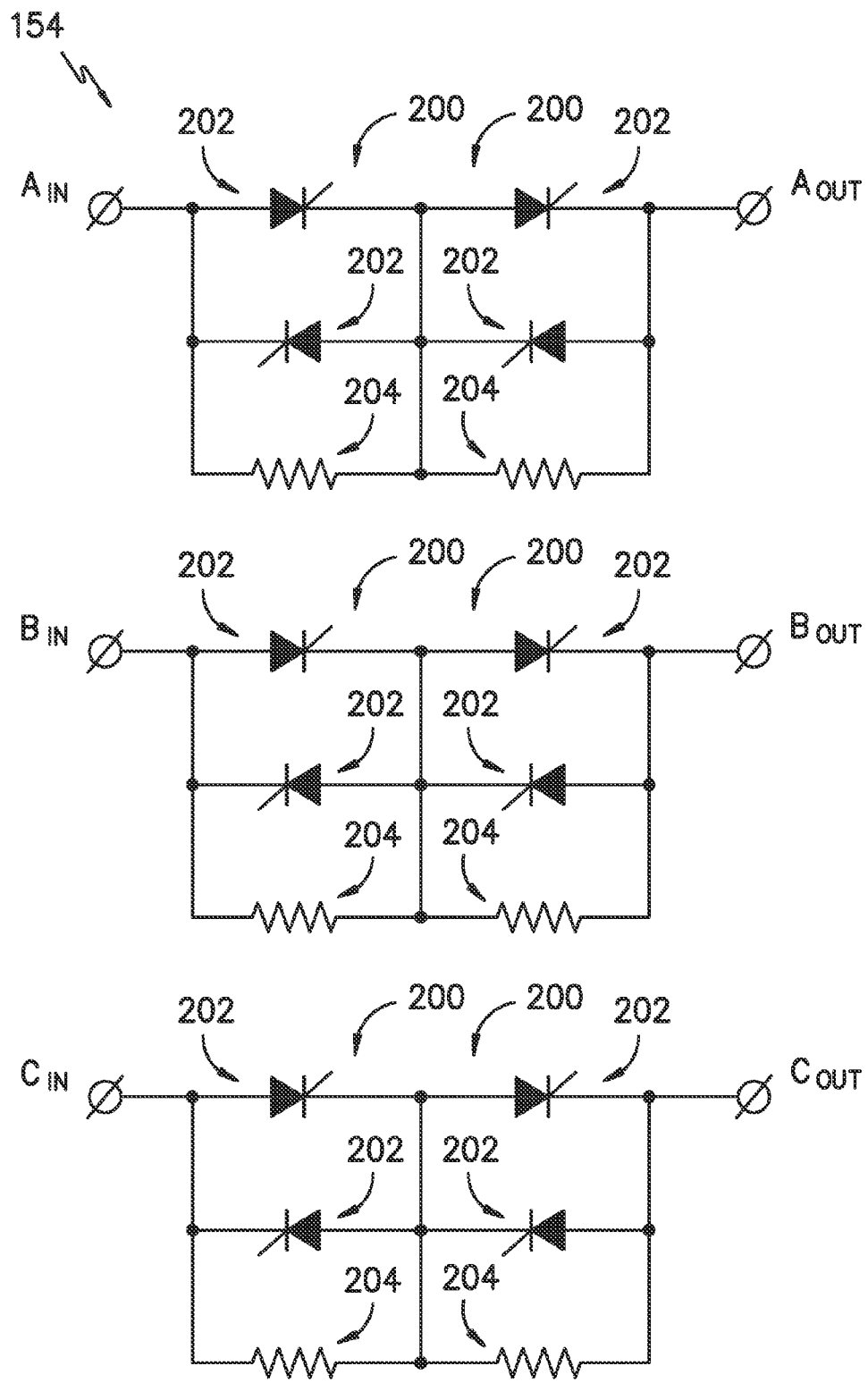
FIG. —3—

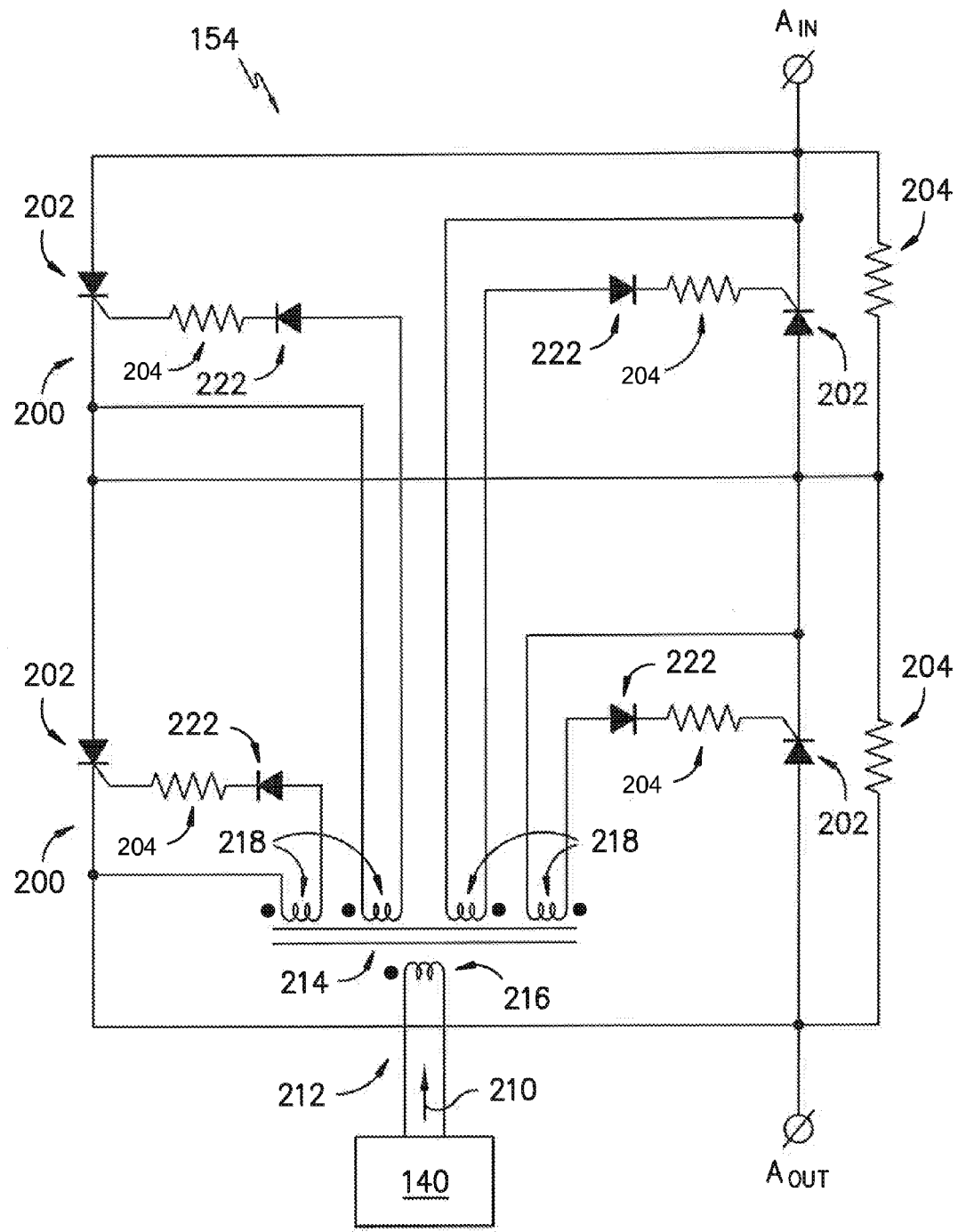
FIG. —4—

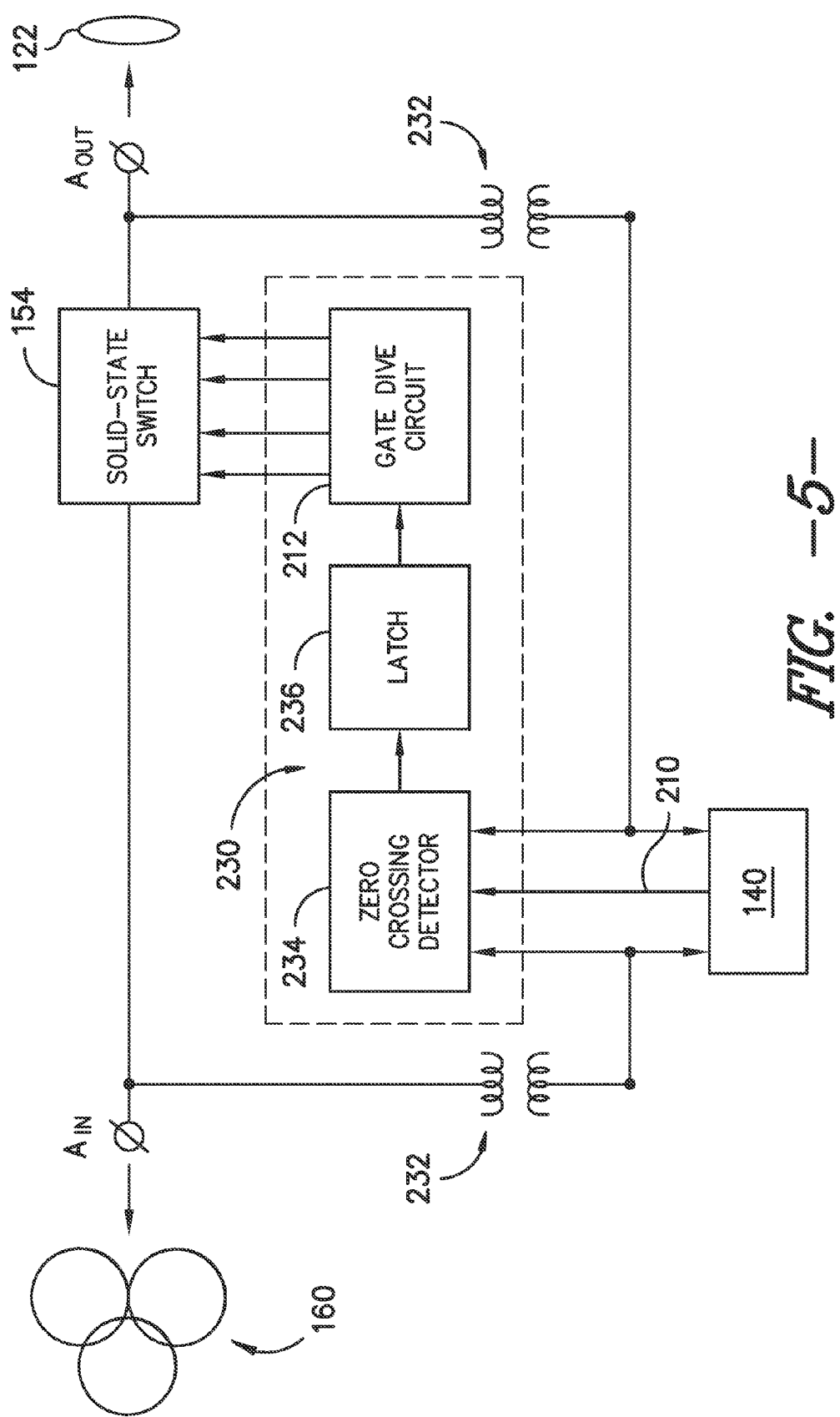
FIG. -5-

# DOUBLY-FED INDUCTION GENERATOR WIND TURBINE SYSTEM HAVING SOLID-STATE STATOR SWITCH

FIELD OF THE INVENTION

The present disclosure relates generally to renewable energy sources, and more particularly to doubly fed induction generator wind turbine systems that utilize solid-state stator switches.

BACKGROUND OF THE INVENTION

Wind turbines have received increased attention as a renewable energy source. Wind turbines use the wind to generate electricity. The wind turns multiple blades connected to a rotor. The spin of the blades caused by the wind spins a shaft of the rotor, which connects to a generator that generates electricity. Certain wind turbine systems include a doubly fed induction generator (DFIG) to convert wind energy into electrical power suitable for output to an electrical grid. DFIGs are typically connected to a converter that regulates the flow of electrical power between the DFIG and the grid. More particularly, the converter allows the wind turbine to output electrical power at the grid frequency regardless of the rotational speed of the wind turbine blades.

A typical DFIG system includes a wind driven DFIG having a rotor and a stator. The stator of the DFIG is coupled to the electrical grid through a stator bus. A power converter is used to couple the rotor of the DFIG to the electrical grid. The power converter can be a two-stage power converter including both a rotor side converter and a line side converter. The rotor side converter can receive alternating current (AC) power from the rotor via a rotor bus and can convert the AC power to a DC power. The line side converter can then convert the DC power to AC power having a suitable output frequency, such as the grid frequency. The AC power is provided to the electrical grid via a line bus. An auxiliary power feed can be coupled to the line bus to provide power for components used in the wind turbine system, such as fans, pumps, motors, and other components of the wind turbine system.

A typical DFIG system includes a two-winding transformer having a high voltage primary (e.g. greater than 12 KVAC) and a low voltage secondary (e.g. 575 VAC, 690 VAC, etc.) to couple the DFIG system to the electrical grid. The high voltage primary can be coupled to the high voltage electrical grid. The stator bus providing AC power from the stator of the DFIG and the line bus providing AC power from the power converter can be coupled to the low voltage secondary. In this system, the output power of the stator and the output power of the power converter are operated at the same voltage and combined into the single transformer secondary winding at the low voltage.

More recently, DFIG systems have included a three winding transformer to couple the DFIG system to the electrical grid. The three winding transformer can have a high voltage (e.g. greater than 12 KVAC) primary winding coupled to the electrical grid, a medium voltage (e.g. 6 KVAC) secondary winding coupled to the stator bus, and a low voltage (e.g. 575 VAC, 690 VAC, etc.) auxiliary winding coupled to the line bus. The three winding transformer arrangement can be preferred in increased output power systems (e.g. 3 MW systems) as it reduces the current in the stator bus and other components on the stator side of the DFIG.

Typical DFIG systems utilize a mechanical stator switch between the stator bus and the transformer. Such switch may, for example, provide grid isolation during low wind speed periods, excessive wind speed periods, or other critical periods. A typical stator switch is a mechanical switch with a variety of moving components, and may be operated 100,000 or more times during its projected lifetime. Accordingly, known switches are generally expensive to purchase and operate, and are prone to failure during service.

Accordingly, improved DFIG wind turbine systems are desired in the art. Particularly, DFIG wind turbine systems which utilize improved stator switches with increased operable lives and decreased failure risks would be advantageous.

BRIEF DESCRIPTION OF THE INVENTION

Aspects and advantages of the invention will be set forth in part in the following description, or may be obvious from the description, or may be learned through practice of the invention.

In one embodiment, the present disclosure is directed to a wind turbine system. The system includes a wind driven doubly fed induction generator having a rotor and a stator, the stator providing AC power to a stator bus. The system further includes a power converter coupled to the rotor of the doubly fed induction generator, the power converter providing an output to a line bus, and a transformer coupled to the stator bus. The system further includes a solid-state switch coupled between the stator bus and the transformer.

In another embodiment, the present disclosure is directed to a wind turbine system. The system includes a wind driven doubly fed induction generator having a rotor and a stator, the stator providing AC power to a stator bus. The system further includes a power converter coupled to the rotor of the doubly fed induction generator, the power converter providing an output to a line bus, and a transformer coupled to the stator bus. The system further includes a three-phase solid-state switch coupled between the stator bus and the transformer, each phase of the switch including at least one silicon-controlled rectifier (SCR) assembly, the at least one SCR assembly comprising two SCRs connected in a back-to-back arrangement.

In yet another embodiment, the present disclosure is directed to a method for controlling alternating current (AC) power transmission. The method includes generating AC power, outputting the AC power to a stator bus, and gating transmission of the AC power from the stator bus to a transformer using a solid-state switch.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 depicts an exemplary DFIG wind turbine system according to an exemplary embodiment of the present disclosure;

FIG. 2 depicts an exemplary solid-state switch according to an exemplary embodiment of the present disclosure;

FIG. 3 depicts an exemplary solid-state switch according to another exemplary embodiment of the present disclosure;

FIG. 4 depicts an exemplary solid-state switch, including a gate drive circuit, according to an exemplary embodiment of the present disclosure; and FIG. 5 depicts a single phase of an exemplary zero-crossing control circuit coupled to a gate drive circuit and solid-state switch according to an exemplary embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods for regulating voltage in a doubly fed induction generator (DFIG) system. The DFIG system can include a wind driven doubly fed induction generator having a rotor and a stator. The stator can provide AC power to a stator bus. The rotor can provide AC power to a power converter. The power can provide an output to a line bus. The stator bus and the line bus can be coupled to an electrical grid through a transformer, such as a two-winding transformer or a three-winding transformer. An auxiliary power feed can be coupled to the output of the power converter. The auxiliary power feed can provide power for various components of the wind turbine system, such as fans, pumps, motors, and other components of the wind turbine system.

According to aspects of the present disclosure, a solid-state switch can be utilized between the stator bus and the transformer. Such solid-state switch generally may have no moving parts, and may replace previously utilized mechanical switches. The use of a solid-state switch according to the present disclosure may provide a variety of advantages. For example, the life-span of the switch may be increased and the risk of failure during system operation reduced due to the lack of moving parts. Additionally, the efficiency of the switch may be significantly increased. Further, the use of a solid-state switch as discussed herein may reduce or virtually eliminate any time delays between the receipt of a signal, such as a gate drive signal, and operation of the switch in response to the signal. Still further, in exemplary embodiments, solid-state switches as discussed herein may gate at zero-voltage crossings, thus reducing or virtually eliminating the risk of power transients.

FIG. 1 depicts an exemplary doubly-fed induction generator (DFIG) wind turbine system 100 according to an exemplary embodiment of the present disclosure. In the exemplary system 100, a rotor 106 includes a plurality of rotor blades 108 coupled to a rotating hub 110, and together define a propeller. The propeller is coupled to an optional gear box 112, which is, in turn, coupled to a generator 120. In accordance with aspects of the present disclosure, the generator 120 is a doubly fed induction generator (DFIG) 120.

DFIG 120 is typically coupled to a stator bus 122 and a power converter 130 via a rotor bus 124. The stator bus 122 provides an output multiphase power (e.g. three-phase power) from a stator of DFIG 120 and the rotor bus 124 provides an output multiphase power (e.g. three-phase power) of the rotor of DFIG 120. Referring to the power converter 130, DFIG 120 is coupled via the rotor bus 124 to a rotor side converter 132. The rotor side converter 132 is coupled to a line side converter 134 which in turn is coupled to a line side bus 138.

In exemplary configurations, the rotor side converter 132 and the line side converter 134 are configured for normal operating mode in a three-phase, pulse width modulation (PWM) arrangement using insulated gate bipolar transistors (IGBTs) as switching devices. Other suitable switching devices can be used, such as insulated gate commuted thyristors, MOSFETs, bipolar transistors, silicon controlled rectifiers, or other suitable switching devices. The rotor side converter 132 and the line side converter 134 can be coupled via a DC link 135 across which is the DC link capacitor 136.

The power converter 130 can be coupled to a controller 140 to control the operation of the rotor side converter 132 and the line side converter 134. For instance, the controller 140 can send control commands to the rotor side converter 132 and line side converter 134 to control the modulation of switching elements (such as IGBTs) used in the power converter 130 to provide a desired real and reactive power output. The controller 140 can be any suitable control circuit. For instance, in one aspect the controller can include summers, compensating regulators, and other devices used to process signals received at the controller 140. In another embodiment, the controller 140 can include a processing device (e.g. microprocessor, microcontroller, etc.) executing computer-readable instructions stored in a computer-readable medium. The instructions when executed by the processing device can cause the processing device to perform control operations, such as regulating voltage of the DFIG wind turbine system 100 according to any exemplary aspects of the present disclosure.

As illustrated, the system 100 includes a transformer 160 coupling the wind turbine system 100 to an electrical grid 180. The transformer 160 of FIG. 1 is a three-winding transformer that includes a high voltage (e.g. greater than 12 KVAC) primary winding 162 coupled to the electrical grid, a medium voltage (e.g. 6 KVAC) secondary winding 164 coupled to the stator bus 122, and a low voltage (e.g. 575 VAC, 690 VAC, etc.) auxiliary winding 166 coupled to the line bus 138. It should be understood that the transformer 160 can be a three-winding transformer as shown, or alternatively may be a two-winding transformer having only a primary winding 162 and a secondary winding 164; may be a four-winding transformer having a primary winding 162, a secondary winding 164, an auxiliary winding 166, and an additional auxiliary winding; or may have any other suitable number of windings.

An auxiliary power feed 170 is coupled to the output of the power converter 130. The auxiliary power feed 170 acts as a power source for various components of the wind turbine system 100. For instance, the auxiliary power feed 170 can power fans, pumps, motors, and other suitable components of the wind turbine system 100.

In operation, power generated at DFIG 120 by rotating the rotor 106 is provided via a dual path to electrical grid 180. The dual paths are defined by the stator bus 122 and the rotor bus 124. On the rotor bus 124 side, sinusoidal multi-phase (e.g. three-phase) alternating current (AC) power is provided to the power converter 130. The rotor side power converter 132 converts the AC power provided from the rotor bus 124 into direct current (DC) power and provides the DC power to the DC link 135. Switching devices (e.g. IGBTs) used in parallel bridge circuits of the rotor side power converter 132 can be modulated to convert the AC power provided from the rotor bus 124 into DC power suitable for the DC link 135.

The line side converter 134 converts the DC power on the DC link 135 into AC power at a frequency suitable for the electrical grid 180. In particular, switching devices (e.g. IGBTs) used in bridge circuits of the line side power converter 134 can be modulated to convert the DC power on the DC link 135 into AC power on the line side bus 138. The power from the power converter 130 can be provided via the auxiliary winding 166 of the transformer 160 to the electrical grid 180.

The power converter 130 can receive control signals from, for instance, the controller 140. The control signals can be based, among other things, on sensed conditions or operating characteristics of the wind turbine system 100. For instance, the control signals can be based on sensed voltage associated with the transformer 160 as determined by a voltage sensor. As another example, the control signals can be based on sensed voltage associated with the auxiliary power feed 170 as determined by a voltage sensor.

Typically, the control signals provide for control of the operation of the power converter 130. For example, feedback in the form of sensed speed of the DFIG 120 can be used to control the conversion of the output power from the rotor bus 124 to maintain a proper and balanced multi-phase (e.g. three-phase) power supply. Other feedback from other sensors can also be used by the controller 140 to control the power converter 130, including, for example, stator and rotor bus voltages and current feedbacks. Using the various forms of feedback information, switching control signals (e.g. gate timing commands for IGBTs), stator synchronizing control signals, and circuit breaker signals can be generated.

On the stator bus 122 side, sinusoidal multi-phase (e.g. three-phase) alternating current (AC) power is provided from the stator of the generator 120 to the stator bus 122, and from the stator bus 122 to the transformer 160, and in particular to the secondary winding 164 thereof. Further, a solid-state switch 154 may be coupled between the stator bus 122 and the transformer 160. The solid-state switch 154 may connect and disconnect the stator bus 122 and transformer 160 as required, and may thus provide grid isolation during, for example, low wind speed periods, excessive wind speed periods, or other critical operational periods.

A solid-state switch 154 is generally a switch that has no moving parts, and instead utilizes semiconductors to control current flow therethrough. Referring now to FIGS. 2 and 3, exemplary embodiments of a solid-state switch 154 according to the present disclosure are shown. In exemplary embodiments, the switch 154 is a three-phase switch 154, and each phase includes one or more silicon-controlled rectifier (SCR) assemblies 200. Each SCR assembly may include, for example, two SCRs 202 connected in a back-to-back arrangement, as illustrated in FIGS. 2 and 3. FIG. 2 illustrates one embodiment wherein each phase utilizes a single SCR assembly 200. FIG. 3 illustrates another embodiments, wherein each phase utilizes a plurality of SCR assemblies 200, such as two as illustrated or three, four, or more, arranged in series. Additionally, resistors 204 may be included in parallel if required. For example, in the embodiment as shown in FIG. 3, two resistors 204 are included in the SCR assembly 200 in parallel.

A gate drive circuit may be utilized to control operation of the solid-state switch 154 such that the switch is gated as required. The gate drive circuit may thus be coupled to the solid-state switch 154 for gating the solid-state switch 154. In general, a gate drive circuit may receive a gate drive signal 210 from the controller 140, and may operate the solid-state switch 154 based on this signal 210. In exemplary embodiments, the gate drive signal 210 may be a bi-polar square wave, which may for example operate at 10,000 Hertz or another suitable frequency. Alternatively, however, any suitable gate drive signal 210 may be utilized.

Any suitable gate drive circuit may be utilized to control solid-state switch 154 operation. Referring now to FIG. 4, one exemplary embodiment of a gate drive circuit 212 is shown. As shown, the gate drive circuit 212 may include a switch transformer 214 configured to receive the gate drive signal 210. In one exemplary embodiment as illustrated, the switch transformer 214 may be a toroidal transformer 214 having a primary coil 216 and a plurality of secondary coils 218, such as four coils 218 as shown or alternatively two, three, five, six or more coils 218. Each secondary coil 218 may, for example, be coupled to one of the plurality of SCRs 202 as shown. Alternatively, multiple transformers 214 each having a primary coil 216 and a single secondary coil 218 may be utilized, with each transformer 214 for example coupled to one of the plurality of SCRs 202. Still further, any suitable transformer or transformers are within the scope and spirit of the present disclosure.

As further shown, a gate drive circuit 212 may include one or more resistors 204 or other suitable stabilizing circuit elements, and one or more diodes 222. The stabilizing circuit elements and diodes may be coupled between the switch transformer(s) 214 and the solid-state switch 154, such as between the secondary coils 218 and the SCRs 202. For example, a stabilizing circuit element and a diode 222 may be coupled between each secondary coil 218 and the associated SCR 202, as shown in FIG. 4. The stabilizing circuit element may stabilize the gate current pulse being transmitted from the switch transformer 214 to the SCR 202, and the diode 222 may provide a positive gate potential to the SCR 202.

Referring now to FIG. 5, in some embodiments, a zero-crossing circuit 230 may be coupled to the solid-state switch 154. In general, the zero-crossing circuit 230 may adjust the gate drive signal 210 such that the SCRs 202 are only gated at zero-voltage crossings, thus advantageously reducing or virtually eliminating the risk of power transients during operation. The zero-crossing circuit 230 may thus, for example, be coupled to the controller 140 for initial receipt of the gate drive signal 210. A zero-crossing circuit 230 may include, for example, one or more potential transformers 232 and a zero-crossing detector 234. The transformers 232 may be coupled to the zero-crossing detector 234, as shown. Additionally, the gate drive signal 210 may initially be provided to the zero-crossing detector 234 from the controller 140, as shown. In some embodiments, a latch 236 or other suitable data storage element may additionally be provided, such as between the zero-crossing detector 234 or zero-crossing circuit 230 in general and the gate drive circuit 212.

Referring again to FIG. 1, various circuit breakers, fuses, contactors, and other devices, such as grid circuit breaker 158, stator bus circuit breaker 156, and line bus circuit breaker 152, can be included in the system 100 to connect or disconnect corresponding buses, for example, when current flow is excessive and can damage components of the wind turbine system 100 or for other operational considerations. Additional protection components can also be included in the wind turbine system 100.

The present disclosure is further directed to methods for controlling alternating current (AC) power transmission, such as in exemplary embodiments in a wind turbine system 100. A method may include, generating AC power, such as in a generator 120 as discussed herein. A method may further include, for example, outputting the AC power to a stator bus 122. For example, the AC power may be provided from the stator of the generator 120 to a stator bus 122. A method may further include, for example, gating transmission of the AC power from the stator bus 122 to a transformer 160. Advantageously, such gating may be performed by a solid-state switch 154, as discussed herein. Further, in some exemplary embodiments as discussed herein, the gating step may occur only at zero-voltage crossings.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wind turbine system, comprising:
    a wind driven doubly fed induction generator having a rotor and a stator, the stator providing AC power to a stator bus;
    a power converter coupled to the rotor of the doubly fed induction generator, the power converter providing an output to a line bus;
    a transformer coupled to the stator bus; and
    a three-phase solid-state switch coupled between the stator bus and the transformer, wherein each phase comprises a silicon-controlled rectifier (SCR) assembly comprising at least two SCRs connected in series with a first node therebetween and at least two resistors connected in series with a second node therebetween, wherein the first node is connected to the second node.

2. The wind turbine system of claim 1, wherein each SCR assembly comprises two SCRs connected in a back-to-back arrangement.

3. The wind turbine system of claim 1, wherein each phase comprises a plurality of SCR assemblies arranged in series.

4. The wind turbine system of claim 1, further comprising a gate drive circuit coupled to the solid-state switch for gating the solid-state switch, the gate drive circuit comprising a switch transformer configured to receive a gate drive signal.

5. The wind turbine system of claim 4, wherein the switch transformer is a toroidal transformer comprising a primary coil and a plurality of secondary coils.

6. The wind turbine system of claim 5, wherein the solid-state switch comprises a plurality of silicon-controlled rectifiers (SCRs), and wherein each of the plurality of secondary coils is coupled to one of the plurality of SCRs.

7. The wind turbine system of claim 5, wherein the gate drive circuit further comprises a plurality of stabilizing circuit elements and a plurality of diodes, and wherein one of the plurality of stabilizing circuit elements and one of the plurality of diodes is coupled between each of the plurality of secondary coils and the associated one of the plurality of SCRs.

8. The wind turbine system of claim 1, further comprising a zero-crossing control circuit coupled to the solid-state switch, the zero-crossing control circuit comprising a potential transformer and a zero-crossing detector, the zero-crossing control circuit further coupled to a controller for receipt of a gate drive signal.

9. The wind turbine system of claim 1, wherein the transformer comprises a primary winding coupled to an electrical grid and a secondary winding coupled to the stator bus.

10. The wind turbine system of claim 9, wherein the transformer further comprises an auxiliary winding coupled to the line bus.

11. The wind turbine system of claim 1, further comprising a circuit breaker coupled between the solid-state switch and the transformer.

12. A wind turbine system, comprising:
    a wind driven doubly fed induction generator having a rotor and a stator, the stator providing AC power to a stator bus;
    a power converter coupled to the rotor of the doubly fed induction generator, the power converter providing an output to a line bus;
    a transformer coupled to the stator bus; and
    a three-phase solid-state switch coupled between the stator bus and the transformer, each phase of the solid-state switch comprising at least one silicon-controlled rectifier (SCR) assembly having at least two SCRs connected in series with a first node therebetween and at least two resistors connected in series with a second node therebetween, wherein the first node is connected to the second node, the at least one SCR assembly comprising two SCRs connected in a back-to-back arrangement.

13. The wind turbine system of claim 12, wherein each phase comprises a plurality of SCR assemblies arranged in series.

14. The wind turbine system of claim 12, further comprising a gate drive circuit coupled to the solid-state switch for gating the solid-state switch, the gate drive circuit comprising a toroidal transformer configured to receive a gate drive signal.

15. The wind turbine system of claim 12, further comprising a zero-crossing control circuit coupled to the solid-state switch, the zero-crossing control circuit comprising a potential transformer and a zero-crossing detector, the zero-crossing control circuit further coupled to a controller for receipt of a gate drive signal.

16. A method for controlling alternating current (AC) power transmission, the method comprising:
    generating AC power;
    outputting the AC power to a stator bus; and
    gating transmission of the AC power from the stator bus to a transformer using a three-phase solid-state switch, wherein each phase of the solid-state switch comprises at least one silicon-controlled rectifier (SCR) assembly having at least two SCRs connected in series with a first node therebetween and at least two resistors connected in series with a second node therebetween, wherein the first node is connected to the second node.

17. The method of claim 16, wherein the gating step occurs only at zero-voltage crossings.

* * * * *